F. A. & O. F. HELWIG.
PHOTOGRAPHIC PRINTING FRAME.
APPLICATION FILED MAY 2, 1914.
1,148,967.
Patented Aug. 3, 1915.
2 SHEETS—SHEET 2.
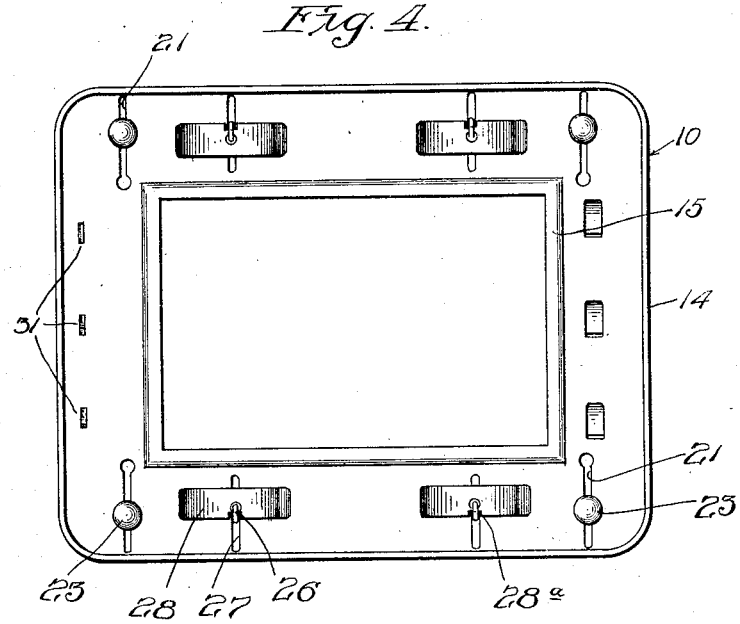
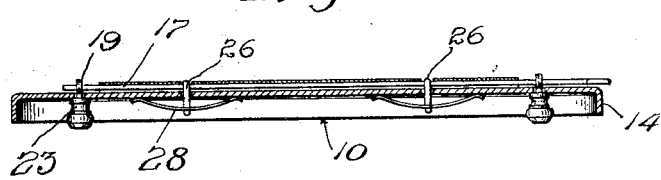
 
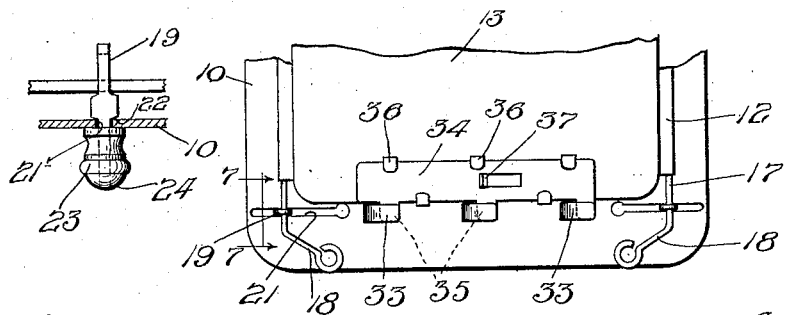
Witnesses:
Charles W. Poole
Maurice D. Herman
Inventors:
Frederick A. Helwig.
Oscar F. Helwig.
by Poole & Cromer Attys.

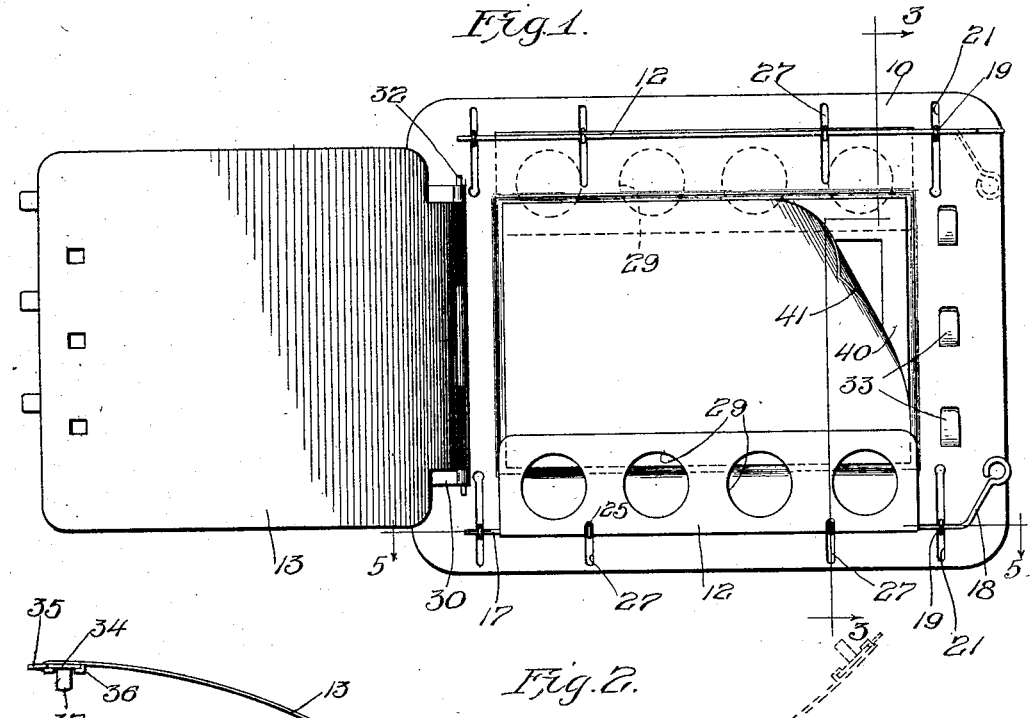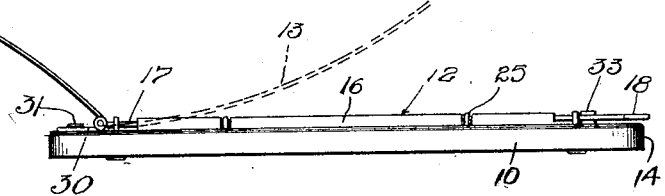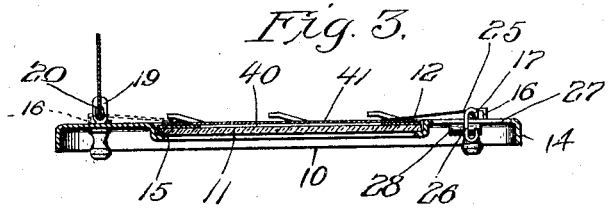

UNITED STATES PATENT OFFICE.

FREDERICK A. HELWIG AND OSCAR F. HELWIG, OF CHICAGO, ILLINOIS.

PHOTOGRAPHIC-PRINTING FRAME.

1,148,967.  Specification of Letters Patent.  Patented Aug. 3, 1915.

Application filed May 2, 1914. Serial No. 835,808.

*To all whom it may concern:*

Be it known that we, FREDERICK A. HELWIG and OSCAR F. HELWIG, citizens of the United States, and residents of Chicago, in the county of Cook and State of Illinois, have invented certain new and useful Improvements in Photographic - Printing Frames; and we do hereby declare that the following is a full, clear, and exact description thereof, reference being had to the accompanying drawings, and to the letters of reference marked thereon, which form a part of this specification.

This invention relates to improvements in photographic printing frames, of that class adapted for use in the art of printing upon sheets of sensitized paper, a photographic reproduction from a negative plate or film, by exposing the paper and negative to light in the manner well known to those skilled in the art.

A printing frame of the usual construction comprises a rectangular frame supporting a plate of glass, and provided with a removable cover adapted to inclose the negative and printing paper within the frame and to exclude the light therefrom. The operation of this device consists in placing the negative in contact with the glass, applying the sheet over the film and securing the cover in position over the paper to hold the same and the film in a stationary position during the printing operation. Considerable difficulty has been experienced in the use of this common form of printing frame, owing to the fact that the negative and printing paper are both held in position by means of the removable cover, thus at each printing operation the operator must arrange the film properly in the frame, place the sheet of printing paper upon the film in the proper manner to obtain a regularly arranged photographic reproduction upon the sheet, and, while holding the sheet and film in the desired position, the cover is then secured in the frame in contact with the reverse face of the sheet. To accomplish the proper results requires considerable dexterity on the part of the operator, and unless the person is experienced in the use of the ordinary frame, great annoyance, loss of time and material results. Furthermore, in the instance that it is desired to make several prints from the same negative, each printing operation requires the rearrangement of the film and printing paper with the same degree of care and patience. From these remarks it is apparent that the art of photographic printing requires much time, labor and skill, and hence inclined to be distasteful to the amateur photographer.

The purpose of our invention is, therefore, to obviate the difficulties above mentioned by embodying in a printing frame means for retaining the negative independently of the paper so that the operation of printing can be accomplished with little trouble and with the assurance of favorable results. This feature, together with others which will be pointed out as we proceed with the description of the device constituting our invention, are herein fully described, specifically set forth in the appended claims, and fully illustrated in the accompanying drawings, in which, Figure 1 is a plan view of our improved printing frame, showing the cover thereof in open position; Fig. 2 is a view in side elevation of the device in the same position as shown in Fig. 1; Fig. 3 is a transverse sectional view, taken on line 3—3 of Fig. 1; Fig. 4 is a bottom plan view of the printing frame; Fig. 5 is a longitudinal sectional view taken on line 5—5 of Fig. 1; Fig. 6 is a fragmentary plan view showing the cover in locked position; and Fig. 7 is an enlarged detail view taken on line 7—7 of Fig. 6.

Referring to the drawings—a printing frame, embodying the features of our invention, comprises in general a flat metal frame 10, provided with a centrally disposed transparent panel 11, two spring actuated clamping members 12, 12, and a flexible cover 13 of sheet metal, in hinged connection with the frame, and adapted to extend over the upper surface of the frame and to be secured in horizontal position.

Referring now more in detail to the construction of the device and the several members constituting the same, the frame 10 is, by preference, formed from a sheet of metal of suitable nature, as for instance of tin or aluminum, said frame being rectangular in shape and provided about its outer margin with a downwardly extending flange 14, for the purpose of assuring the proper rigidity of construction. A comparatively large central opening is provided, the margins thereof being depressed to provide a channel 15 surrounding said aperture and adapted to retain the plate of glass 11, said channel being of proper depth to permit the upper surface of the glass to lie substantially in the plane of, although being preferably slightly below, the upper surface of the frame 10.

At the sides of the frame and opposed to each other on either side of the central aperture, are mounted the clamps 12, 12, comprising rectangular sheets of thin metal of a length substantially equal to that of the said aperture, their ends, by preference terminating adjacent to the end margins thereof. These clamps are identical in construction, each of said clamps being pivotally mounted upon the frame along their outer longitudinal margins by means hereinafter described, and to be manipulated to extend toward each other beyond the adjacent margins of the glass plate 11, as shown in full and dotted lines in Figs. 1 and 3, and also to be revolved upwardly to vertical position, as also shown in said figures, although if desired they are free to be turned backward to a horizontal position. Each of the clamps is mounted upon the frame in the following manner: The rear margin of the clamp is bent to form a flange 16 extending at right angles thereto, adapted to engage the frame when the clamp is in its operative position. Rigidly secured to the under surface of the clamp, just inwardly of the said flange, is a pivot rod 17, extending a short distance beyond the end margins of the clamp. One end of the rod, namely, that end distant from the point of connection of the cover 13 with the frame, is of greater length and is bent at an angle to form an operating finger 18 provided with a loop. The rod 17 is mounted in bearing members 19, 19, located at either end of the clamp, said bearing members being provided with vertical slots 20 through which the rod extends. The purpose of the vertical slots is to permit limited vertical movement of the rod, as will be hereinafter pointed out. The stem of each bearing member extends through a slot 21 formed in the frame member, said slot extending substantially from the outer margin of the frame to the margin of the central aperture thereof. As shown in Fig. 7, the stems of the bearing members are greater in diameter than the width of the slots 21, and are provided upon opposite ends with guide slots 22 adapted to be engaged by the margins of the slots 21 of the frame. The lower ends of the bearing members are provided with screw-threads, and are adapted to carry knurled screws 23 which extend below the margins of the flange 14 of the frame and are adapted to bear against the under surface of the frame, thus securely holding the bearing member in place and preventing movement of the same within the slot 21. The ends of the knurled screws are preferably provided with caps 24 of hard rubber, said caps being adapted to rest in contact with the surfaces supporting the frame. It is to be noted that there are four of these knurled screws (Fig. 4), and that the same act as feet to support the frame. The clamps are further provided with tension means constantly acting on said clamps to increase the downward pressure upon the negative to be held thereby. This tension means comprises a plurality of spring devices constructed as follows: Each clamp is provided intermediate the ends with two slots 25 extending transversely inward from the outer margins of the clamps, which act to expose the rod beneath. Surrounding the rod at these points are metal loops or connecting members 26, which extend through slots 27 formed in the frame. These slots 27 are parallel with the slots 22 and also extend transversely between the inner and outer margins of the frame. These connecting members are attached to flat springs 28 located upon the under side of the frame (Fig. 4), and are normally concave upon the upper surfaces, said springs bearing at their ends upon the under surface of the frame. These connecting members 26 extend through apertures in the central portions of the springs and have their free ends bent upwardly to engage notches 28ª formed in the side margin of each spring. The purpose of this form of connection is to maintain the springs in the same positions; that is, in position parallel with the side margins of the frame. By this construction, therefore, said springs act to exert a constant downward pressure upon the rod and hence upon the rear margins of the clamps. The tension of the springs is varied as the clamps are rotated to their several positions, by reason of the flange 16 at the outer margin of the clamp, which acts to force the said rear margin upwardly from the surface of the frame as the same is moved from its vertical to horizontal position, thus increasing the tension of the spring and the holding power of the clamp. The operation of the clamps is hence accompanied by a slight vertical movement of the rods 17 and, to permit this movement, the slotted form of bearing members is employed.

By reason of the slots 21 and 27, the clamps are adapted to be adjusted transversely of the frame so that the same may be moved toward or from each other in order to accommodate various sizes of negatives in the frame. This adjustment is accomplished by unscrewing the knurled screws 23 sufficiently to release them, thereby permitting the bearing members to be moved in the slots 21. The clamps now may be easily adjusted in any position and again secured in position by tightening the screws 23. The provision of the slots 27 obviously permit the springs 28 and the connecting members 26 to be moved with the clamps. The clamps are preferably provided with a plurality of comparatively large openings 29, herein shown in the form of circular apertures, although they may be of any other desired shape. The purpose of these openings is to permit the margins of the negative to be seen when the clamp is in clamping position, thus aiding in the proper positioning of said negative. These openings further aid in arranging the printing paper upon the negative.

The cover 13 consists of a sheet of flexible metal, preferably spring steel, having under normal conditions a permanent curvature from end to end, so that the upper surface of the same is concave. The cover is less in longitudinal and transverse dimensions than the frame member 10, so that, in closed position, the margins of the cover extend intermediate of the inner and outer margins of said frame member, said cover being mounted upon the frame member by means of a hinge located adjacent to one end of the frame. The said hinge consists of a plate 30 rigidly secured to the frame by means of a plurality of lugs 31 integral with the frame and extending through slots in said plate, said lugs being bent over upon the plate. This plate supports a rod 32 which extends through a bore formed at the adjacent margins of the cover-plate. The cover is adapted to be swung over and downwardly upon the frame and to be fastened in close contact with the frame by means of locking means (Fig. 6), comprising a plurality of locking lugs 33 formed from the metal of the frame and raised slightly above the surface of the same, and an endwise movable plate 34 provided with a plurality of locking ears 35. This plate is mounted at the end margin of the cover by means of lugs 36, which loosely hold the plate so that it may be moved endwise to effect the engagement and release of the ears 35 with the lugs 33. A finger piece 37 projects upwardly from the plate for the purpose of moving the locking plate.

Having described the construction of the device embodying the features of our invention, we will now describe the manner in which it is manipulated in the operation of printing a photographic reproduction upon a sheet of printing paper from a film negative. We prefer to use a mat 40 (Figs. 1 and 3), which may be secured in contact with the glass, for the purpose of providing a regular margin on the finished picture and to avoid the admission of light about the margins of the film. The clamps are then revolved upwardly to permit the film 41 to be inserted thereunder, it being desirable to place one clamp in contact with the film, as shown in Fig. 1, during the operation of placing the film in proper position with respect to the mat, care being taken that the clamps are properly adjusted so as not to extend beyond the inner margins of the mat. Having arranged the film, the other clamp is then revolved down in contact with the film negative. The frame, with the negative in place, is now ready for the printing paper, which is now laid over the film with its margins overlapping the clamps, and the cover 13 brought over in contact with the paper and into the position shown in the dotted lines of Fig. 2. The cover thus bears upon the paper with sufficient pressure to permit an accurate adjustment of the printing paper, the curvature of the cover permitting access to the paper for this purpose. By removing the hand from the paper and simultaneously pressing downwardly upon the free end of the cover, the curvature of the same is gradually decreased and the area of the paper engaged by the cover is likewise increased until the entire surface of the paper is covered. The cover is then secured by means of the locking members, and the frame is ready to be exposed to light in the usual manner. If it is desired to make another reproduction from the same film negative, it is only necessary to release the cover, remove the picture and replace it by another printing sheet, as before suggested, without the film being disturbed or disarranged.

The principal advantages of a printing frame constructed in accordance with our invention are the means for retaining the negative independently of the printing paper by the use of spring clamps and the use of a flexible metal cover. These features make the operation of printing very simple and rapid and successfully overcome the disadvantages of the ordinary form of frame.

It is to be understood that either the plate or film form of negative may be used in our improved device, and, furthermore, its construction may be variously modified in its details without departing from the spirit of the invention. For this reason we do not wish to be limited to the form of device herein described and illustrated, except in so far as specifically pointed out in the appended claims.

We claim as our invention:

1. A photographic printing frame, comprising a frame member provided with a transparent panel, a cover adapted to extend over the upper surface of the frame member, a clamp pivotally mounted on said frame member adjacent to said panel, adapted to release and engage a negative, and means affording lateral adjustment of said clamp relative to said panel.

2. A photographic printing frame, comprising a frame member provided with a transparent panel, a spring clamp pivotally mounted upon said frame, and adapted to be revolved to engage and release a negative, and a cover hinged to said frame, comprising a sheet of flexible material.

3. A photographic printing frame, comprising a frame member provided with a transparent panel, a spring clamp pivotally mounted on said frame member, and adapted to be revolved to engage and release a negative, means affording adjustment of said clamp relative to the frame member, and a cover hinged to said frame and adapted to extend over said panel.

4. A photographic printing frame, comprising a frame member provided with a transparent panel, at least two spring clamps mounted on said frame member, at opposite sides of said panel, and adapted to engage the margins of a negative, and a flexible cover hinged to said frame and adapted to extend over said panel.

5. A photographic printing frame, comprising a frame member provided with a transparent panel, a clamp comprising a strip of metal pivotally and adjustably mounted upon the frame member, and adapted to be revolved downwardly or upwardly to engage and release a negative, a spring attached to said clamp at its outer margin for increasing the clamping action of said clamp, and a cover adapted to extend over said panel.

6. A photographic printing frame, comprising a frame member provided with a transparent panel, a clamp comprising a strip of metal hinged to the frame member, and adapted to be revolved downwardly or upwardly to engage and release a negative, a spring attached to said clamp at its outer margin, for increasing the clamping action of said clamp, means for adjusting said clamp, comprising bearing members connected with and adapted to be moved relatively to the frame member, and a cover attached to said frame member and adapted to extend over said panel in overlapping engagement with the said clamp.

7. A photographic printing frame, comprising a frame member provided with a transparent panel, a clamp comprising a strip of metal mounted upon said frame member and adapted to be revolved downwardly and upwardly to engage and release a negative, a flat spring engaging the under surface of the frame member, means for connecting the spring with the clamp, and a cover adapted to extend over said panel of the frame member in overlapping engagement with the said clamp.

8. A photographic printing frame, comprising a frame member provided with a transparent panel, a clamp comprising a strip of metal mounted upon said frame member and adapted to be revolved downwardly and upwardly to engage and release a negative, a flat, curved spring adapted to engage the under surface of the frame member, means for connecting the spring with the clamp, and a cover comprising a sheet of flexible metal adapted to extend over the frame member in overlapping engagement with the said clamp.

9. A photographic printing frame, comprising a frame member provided with a transparent panel, a clamp comprising a strip of metal provided at its outer margin with a flange, bearing members for said clamp mounted upon the frame member, a flat spring engaging the under surface of the frame member, a connecting member extending through the frame member and secured to said clamp adjacent to the flange thereof, said flange being adapted to engage the surface of the frame member when said clamp is in position to engage a negative, and a cover adapted to extend over said panel in overlapping engagement with said clamp.

10. A photographic printing frame, comprising a frame member provided with a transparent panel, a plurality of clamps comprising strips of metal mounted on said frame member and on opposite sides of the central panel, bearing members for said clamps movably mounted within transverse slots in the frame member, a plurality of flat springs engaging the under surface of the frame member, connecting members extending through slots in the frame member and secured to said clamps, said clamps, bearing members and springs being adapted to be moved toward and from each other to accommodate various sizes of negatives, and a cover adapted to extend over the panel in overlapping engagement with said clamps.

11. A photographic printing frame, comprising a frame member provided with a transparent panel and with transverse slots, a clamp comprising a sheet of metal, adapted to be revolved about its outer margin to engage and release a negative, bearing members for said clamp extending through said transverse slots in said frame member, means for adjusting said bearing members in said slots, a flat spring engaging the under surface of said frame member, a connecting member securing said spring to the clamp and extending through one of the transverse slots in said frame member, and a cover adapted to extend over said panel in overlapping engagement with said clamp.

12. A photographic printing frame, comprising a frame member provided with a transparent panel, a clamp mounted on the frame member and comprising a sheet of metal provided with openings therein, and a cover adapted to extend over said panel in overlapping engagement with said clamp.

13. A photographic printing frame, comprising a frame member of sheet metal provided with a transparent panel, a plurality of adjustable spring clamps mounted upon opposite sides of said panel, and adapted to be revolved downwardly and upwardly to engage a negative, and a cover comprising a sheet of flexible metal hinged upon said frame member and adapted to extend over said panel in overlapping engagement with said clamp.

14. A photographic printing frame, comprising a frame member of sheet metal provided with a marginal flange and an opening having a marginal depression, a plate of glass retained in said depression, a plurality of clamps mounted upon opposite sides of said central opening, adapted to be revolved downwardly and upwardly to engage a negative, and a cover comprising a sheet of flexible metal hinged upon said frame member and adapted to extend over said panel in overlapping engagement with said clamp.

15. A photographic printing frame, comprising a frame member of sheet metal provided with an opening and a plate of glass retained in said opening, a clamp mounted upon said frame member, comprising a sheet of metal adapted to be revolved about its outer margin to engage and release a negative, a cover hinged at one margin to said frame member, said cover consisting of a sheet of flexible spring metal adapted to extend over the said central aperture, and means for locking the opposite margin of said cover to said frame member.

16. A photographic printing frame, comprising a frame member of sheet metal provided with a marginal flange and an opening having a marginal depression, a plate of glass retained in said opening, a plurality of spring clamps mounted upon opposite sides of said opening and adapted to be revolved to engage and release a negative, and a cover hinged at one margin to said frame member, said cover comprising a sheet of flexible spring metal having its outer surface normally concave, and locking means for the free end of said cover comprising an endwise movable plate on the cover provided with a locking ear adapted to engage a lug formed in the frame member.

17. A photographic printing frame, comprising a frame member provided with a transparent panel, at least two spring clamps mounted upon opposite sides of said panel and adapted to be revolved to engage and release a negative, and a cover hinged to said frame member in transverse relation to said clamps, comprising a sheet of flexible spring metal having its outer surface normally concave, and provided at its free end with locking means comprising an endwise movable plate provided with a locking ear adapted to engage a lug formed in the frame member.

In testimony, that we claim the foregoing as our invention we affix our signatures in the presence of two witnesses, this 25th day of April A. D. 1914.

FREDERICK A. HELWIG.
OSCAR F. HELWIG.

Witnesses:
CHARLES H. POOLE,
MAURICE D. HERMAN.

Copies of this patent may be obtained for five cents each, by addressing the "Commissioner of Patents, Washington, D. C."